US012586803B2

(12) United States Patent
Asanuma

(10) Patent No.: US 12,586,803 B2
(45) Date of Patent: Mar. 24, 2026

(54) FUEL CELL SYSTEM

(71) Applicants: TOYOTA JIDOSHA KABUSHIKI KAISHA, Toyota (JP); AISAN KOGYO KABUSHIKI KAISHA, Obu (JP)

(72) Inventor: Daisaku Asanuma, Gamagori (JP)

(73) Assignees: TOYOTA JIDOSHA KABUSHIKI KAISHA, Toyota (JP); AISAN KOGYO KABUSHIKI KAISHA, Obu (JP)

( * ) Notice: Subject to any disclaimer, the term of this patent is extended or adjusted under 35 U.S.C. 154(b) by 490 days.

(21) Appl. No.: 18/191,923

(22) Filed: Mar. 29, 2023

(65) Prior Publication Data

US 2023/0327158 A1      Oct. 12, 2023

(30) Foreign Application Priority Data

Apr. 11, 2022      (JP) ................................. 2022-065311

(51) Int. Cl.
| | |
|---|---|
| *H01M 8/04992* | (2016.01) |
| *H01M 8/0438* | (2016.01) |
| *H01M 8/04537* | (2016.01) |
| *H01M 8/04746* | (2016.01) |
| *H01M 16/00* | (2006.01) |

(52) U.S. Cl.
CPC ... *H01M 8/04992* (2013.01); *H01M 8/04388* (2013.01); *H01M 8/04574* (2013.01); *H01M 8/04753* (2013.01); *H01M 16/006* (2013.01)

(58) Field of Classification Search
None
See application file for complete search history.

(56) References Cited

U.S. PATENT DOCUMENTS

| | | |
|---|---|---|
| 2010/0332038 A1 | 12/2010 | Neu et al. |
| 2012/0315559 A1 | 12/2012 | Noh et al. |
| 2023/0008243 A1 | 1/2023 | Asanuma |
| 2023/0327157 A1 | 10/2023 | Asanuma |

FOREIGN PATENT DOCUMENTS

| | | |
|---|---|---|
| JP | 2012-091577 A | 5/2012 |
| JP | 2012255429 A | 12/2012 |

OTHER PUBLICATIONS

Daisaku Asanuma, U.S. Appl. No. 18/191,927, Non-Final Office Action issued Oct. 1, 2025.

*Primary Examiner* — Jonathan Crepeau
(74) *Attorney, Agent, or Firm* — Dickinson Wright, PLLC

(57) ABSTRACT

A fuel cell system may include: a fuel cell; a hydrogen gas supply passage; a solenoid valve that changes an opening degree of the hydrogen gas supply passage; a pressure sensor that detects a pressure in a downstream supply passage being a part of the hydrogen gas supply passage from the solenoid valve to the fuel cell; and a control circuit. The control circuit detects a rise in the pressure detected by the pressure sensor when increasing a conducted electric current conducted in the solenoid valve from a state where the solenoid valve is closed, and detection of a rising current which is the conducted electric current at a time of the rise in the pressure; and calculates an increase characteristic based on the rising current, the increase characteristic being a relationship between the conducted electric current and the pressure when the conducted electric current increases.

8 Claims, 6 Drawing Sheets

10

FUEL CELL SYSTEM

REFERENCE TO RELATED APPLICATION

This application claims priority from Japanese Patent Application No. No. 2022-065311 filed on Apr. 11, 2022. The entire content of the priority application is incorporated herein by reference.

BACKGROUND ART

The art disclosed herein relates to a fuel cell system.

Japanese Patent Application Publication No. 2012-091577 describes a solenoid valve configured to control a hydraulic pressure of brake fluid for a vehicle. A control circuit configured to control the solenoid valve stores an initial drive amount as an electric current value for driving the solenoid valve. The control circuit stores the initial drive amount according to a differential pressure between an upstream side and a downstream side of the solenoid valve. The control circuit firstly applies an electric current of the initial drive amount when the solenoid valve is activated.

There are variations in characteristics of solenoid valves. Also, a characteristic of a solenoid valve changes due to temperature and/or aging. In regards to this, in Japanese Patent Application Publication No. 2012-091577, the control circuit corrects the initial drive amount. Specifically, the control circuit measures the electric current value flowing in the solenoid valve under a state where a brake pressure is controlled to be a target pressure. The control circuit corrects the stored initial drive amount based on the measured electric current value.

In the art described in Japanese Patent Application Publication No. 2012-091577, a suitable electric current value is measured in the state where the brake pressure is controlled to be the target pressure, and the initial drive amount is corrected based thereon. Because a suitable initial drive amount varies according to the differential pressure, there is a need for measuring the suitable electric current value for each differential pressure and correcting the initial drive amount accordingly. The present teachings provide art configured to allow for easier learning of a characteristic of a solenoid valve used in a fuel cell system.

DESCRIPTION (Aspect 1) A fuel cell system in a first aspect disclosed herein may comprise a fuel cell; a hydrogen gas supply passage configured to supply hydrogen gas to the fuel cell; a solenoid valve configured to change an opening degree of the hydrogen gas supply passage; a pressure sensor configured to detect a pressure in a downstream supply passage which is a part of the hydrogen gas supply passage from the solenoid valve to the fuel cell; and a control circuit configured to control the solenoid valve. The control circuit may be configured to perform: detection of a rise in the pressure detected by the pressure sensor when increasing a conducted electric current conducted in the solenoid valve from a state where the solenoid valve is closed, and detection of a rising current which is the conducted electric current at a time of the rise in the pressure; and calculation of an increase characteristic based on the rising current, the increase characteristic being a relationship between the conducted electric current and the pressure when the conducted electric current increases.

In this fuel cell system, the rising current of the solenoid value is detected. The detection of the rising current allows to calculate the increase characteristic, which is a relationship between the conducted electric current and the pressure when the solenoid valve is opened, with relatively high precision. As such, this fuel cell system allows for easier calculation of an increase characteristic.

Figure 1:
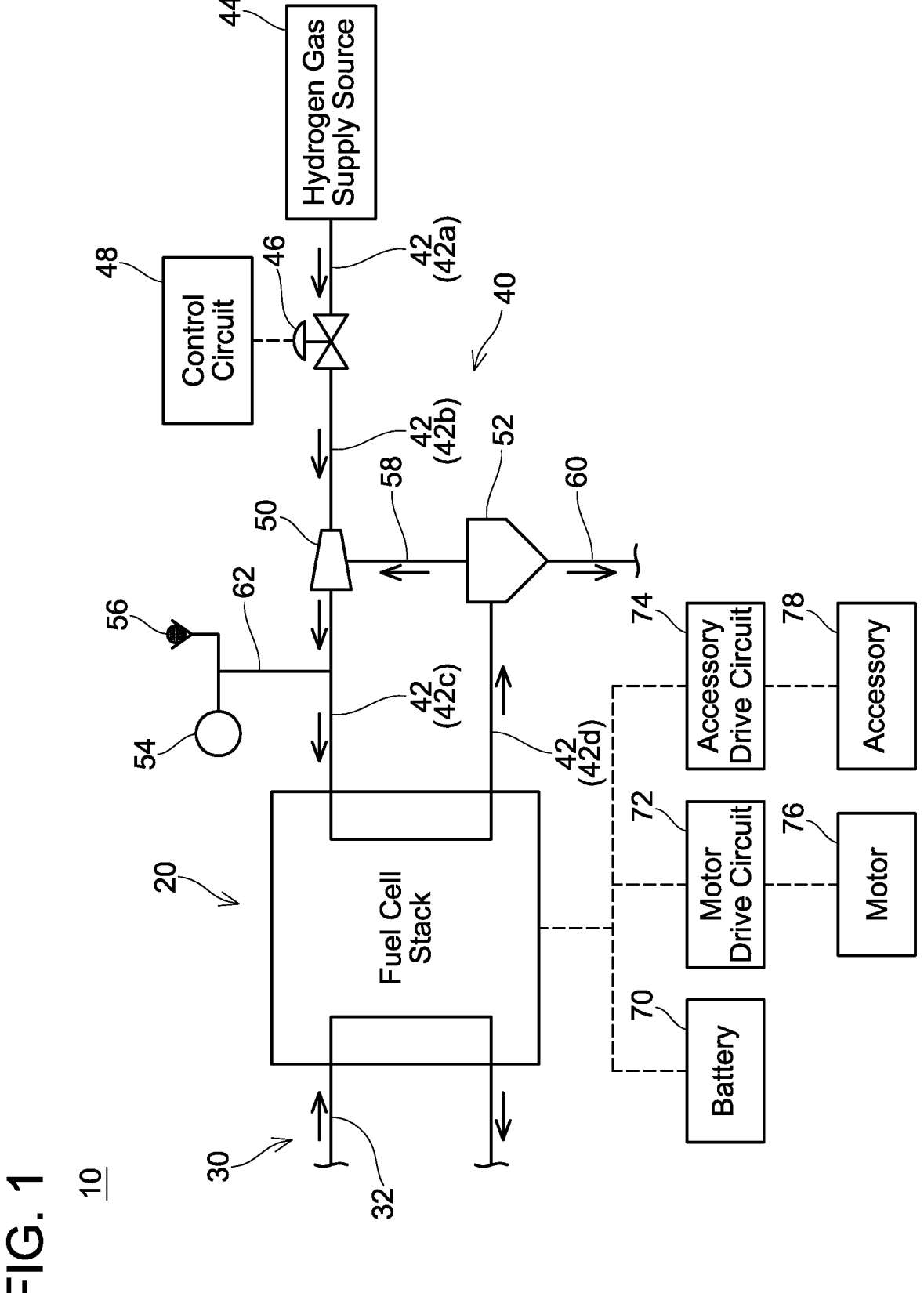
FIG. 1 illustrates a block diagram of a fuel cell system.

(Aspect 2) The control circuit may be configured to store a standard increase characteristic of the solenoid valve and calculate the increase characteristic by correcting the standard increase characteristic based on the rising current.

According to such configuration, the increase characteristic can be calculated with high precision.

(Aspect 3) In the fuel cell system of the aspects 1 and 2, the control circuit may be configured to perform: detection of a fall in the pressure detected by the pressure sensor when decreasing the conducted electric current in the solenoid valve from a state where the solenoid valve is open and detection of a falling current which is the conducted electric current at a time of the fall in the pressure; and calculation of a decrease characteristic based on the falling current, the decrease characteristic being a relationship between the conducted electric current and the pressure when the conducted electric current decreases.

According to such configuration, the decrease characteristic can be easily calculated based on the falling current. Further, the solenoid valve may have hysteresis characteristics, and thus the increase characteristic and the decrease characteristic may be different. According to such configuration, each of the increase characteristic and the decrease characteristic can be calculated.

(Aspect 4) In the fuel cell system of aspect 3, the control circuit may be configured to store a standard decrease characteristic of the solenoid valve and calculate the decrease characteristic by correcting the standard decrease characteristic based on the falling current.

According to such configuration, the decrease characteristic can be calculated with high precision.

(Aspect 5) The fuel cell system of any of the aspects 1 to 4 may further comprise an exhaust valve configured to exhaust the hydrogen gas in the downstream supply passage to outside. The control circuit may be configured to perform the detection of the rising current under a state where the exhaust valve is closed According to such configuration, the increase characteristic can be calculated more precisely.

(Aspect 6) The fuel cell system in any of the aspects 1 to 5 may further comprise a battery. The battery may be charged by a power generated by the fuel cell in the detection of the rising current.

According to such configuration, even when there is no demand for electric power, the rising current can be detected while power is being generated by supplying hydrogen gas to the fuel cell.

(Aspect 7) In any of the fuel cell system of any of the aspects 1 to 6, the detection of the rising current may comprise detection of a first rising current which is the rising current when increasing the conducted electric current at a first sweep speed, and detection of a second rising current which is the rising current when increasing the conducted electric current at a second sweep speed. In this case, the calculation of the increase characteristic may comprise calculation of a first increase characteristic which is the increase characteristic when increasing the conducted electric current at the first sweep speed based on the first rising current, and calculation of a second increase characteristic which is the increase characteristic when increasing the conducted electric current at the second sweep speed based on the second rising current.

According to such configuration, even when the increase characteristic varies according to the sweep speed for increasing the conducted electric current, the increase characteristic can be calculated for each sweep speed.

EMBODIMENTS

A fuel cell system 10 according to an embodiment shown in FIG. 1 is mounted in an electric vehicle. The electric vehicle comprises a motor 76. The motor 76 is configured to rotate drive wheel(s) by operating using power generated by the fuel cell system 10.

The fuel cell system 10 comprises a fuel cell stack 20, an oxygen gas supply device 30, and a hydrogen gas supply device 40. The fuel cell stack 20 is a stack of a plurality of fuel cells. The oxygen gas supply device 30 comprises an oxygen gas supply path 32 routed through the fuel cell stack 20. The oxygen gas supply path 32 allows oxygen gas to be supplied to the fuel cell stack 20. The hydrogen gas supply device 40 comprises a hydrogen gas supply path 42 routed through the fuel cell stack 20. The hydrogen gas supply path 42 allows hydrogen gas to be supplied to the fuel cell stack 20. The oxygen gas supplied by the oxygen gas supply path 32 and the hydrogen gas supplied by the hydrogen gas supply path 42 react with each other in the fuel cell stack 20, by which power is generated in the fuel cell stack 20.

A battery 70, a motor drive circuit 72, and an accessory drive circuit 74 are electrically coupled to the fuel cell stack 20. An output electric current from the fuel cell stack 20 is supplied to the battery 70, by which the battery 70 is charged. The motor drive circuit 72 operates by receiving the supply of power from the fuel cell stack 20 or the battery 70. The motor drive circuit 72 drives the motor 76 by converting direct current voltage supplied from the fuel cell stack 20 or the battery 70 into alternate current voltage and supplying the same to the motor 76. The accessory drive circuit 74 operates by receiving supply of power from the fuel cell stack 20 or the battery 70. The accessory drive circuit 74 drives an accessory 78 by converting direct current voltage supplied from the fuel cell stack 20 or the battery 70 to a lower voltage and supplying the same to the accessory 78.

The hydrogen gas supply device 40 comprises a hydrogen gas supply source 44, a linear solenoid valve 46 (hereafter "LSV 46"), a control circuit 48, an ejector 50, a gas-liquid separator 52, a pressure sensor 54, and an exhaust valve 56.

The hydrogen gas supply source 44 is coupled to an upstream end of the hydrogen gas supply path 42. The hydrogen gas supply source 44 is composed of a hydrogen gas tank, for example. The hydrogen gas supply source 44 supplies high-pressure hydrogen gas to the hydrogen gas supply path 42.

The LSV 46 and the ejector 50 are arranged on the hydrogen gas supply path 42. The ejector 50 is arranged on the hydrogen gas supply path 42 on the downstream side of the LSV 46. Also, on the downstream side of the ejector 50, the hydrogen gas supply path 42 extends within the fuel cell stack 20. The hydrogen gas supplied from the hydrogen gas supply source 44 extends through the LSV 46, the ejector 50, and the fuel cell stack 20 sequentially in this order. Hereafter, a part of the hydrogen gas supply path 42 that is upstream of the LSV 46 will be termed "supply path 42a". Further, a part of the hydrogen gas supply path 42 that is between the LSV 46 and the ejector 50 will be termed "supply path 42b". Hereafter, a part of the hydrogen gas supply path 42 that is between the ejector 50 and the fuel cell stack 20 will be termed "supply path 42c". Hereafter, a part of the hydrogen gas supply path 42 that is downstream of the fuel cell stack 20 will be termed "supply path 42d".

The LSV 46 is a valve configured to open/close the hydrogen gas supply path 42. The LSV 46 is electrically coupled to the control circuit 48. The control circuit 48 controls electric current that flows in the LSV 46 (hereafter, LSV current I). An opening degree of the LSV 46 changes according to the LSV current I. The LSV 46 is closed in a state where the LSV current I is not flowing. The higher the LSV current I, the greater the opening degree of the LSV 46. The hydrogen gas flows from the supply path 42a through the LSV 46 to the supply path 42b in a state where the LSV 46 is open.

An off-gas circulation path 58 is coupled to the ejector 50. An off-gas, which is the hydrogen gas after having passed through the fuel cell stack 20, flows in the off-gas circulation path 58. The off-gas is supplied from the off-gas circulation path 58 to the ejector 50. The ejector 50 adds the off-gas to the hydrogen gas supplied from the supply path 42b and ejects the same to the supply path 42c.

The hydrogen gas ejected from the ejector 50 to the supply path 42c flows into the fuel cell stack 20. The hydrogen gas reacts with the oxygen gas within the fuel cell stack 20. The hydrogen gas having passed though the fuel cell stack 20 (that is, off-gas) flows from the fuel cell stack 20 into the supply path 42d.

The gas-liquid separator 52 is coupled to a downstream end of the supply path 42d. The off-gas circulation path 58 and an exhaust path 60 are coupled to the gas-liquid separator 52. The gas-liquid separator 52 removes moisture from the off-gas supplied from the supply path 42d. The gas-liquid separator 52 discharges the moisture and the residual off-gas outside of the fuel cell system 10 through the exhaust path 60. Further, the gas-liquid separator 52 supplies the off-gas from which the moisture has been removed to the off-gas circulation path 58. As such, as mentioned above, the off-gas is supplied from the off-gas circulation path 58 to the ejector 50.

A branch path 62 is coupled to the supply path 42c. The branch path 62 comprises the pressure sensor 54 and the exhaust valve 56. When the exhaust valve 56 is open, the branch path 62 connects to outside (that is, air). When the exhaust valve 56 is closed, pressure of the hydrogen gas within the branch path 62 is equal to pressure of the hydrogen gas within the supply path 42c. The pressure sensor 54 detects the pressure within the branch path 62. The pressure detected by the pressure sensor 54 is equal to the pressure within the supply path 42c in the state where the exhaust valve 56 is closed.

The control circuit 48 opens the LSV 46 at a predetermined opening degree when power is generated in the fuel cell system 10. Due to this, the hydrogen gas supply path 42 allows the hydrogen gas to be supplied to the fuel cell stack 20. Also, the oxygen gas supply path 32 allows the oxygen gas to be supplied to the fuel cell stack 20. The hydrogen gas and the oxygen gas react each other within the fuel cell stack 20, thereby generating power. The power generated in the fuel cell stack 20 is supplied to the battery 70, the motor drive circuit 72, or the accessory drive circuit 74 according to necessities.

Figure 2:
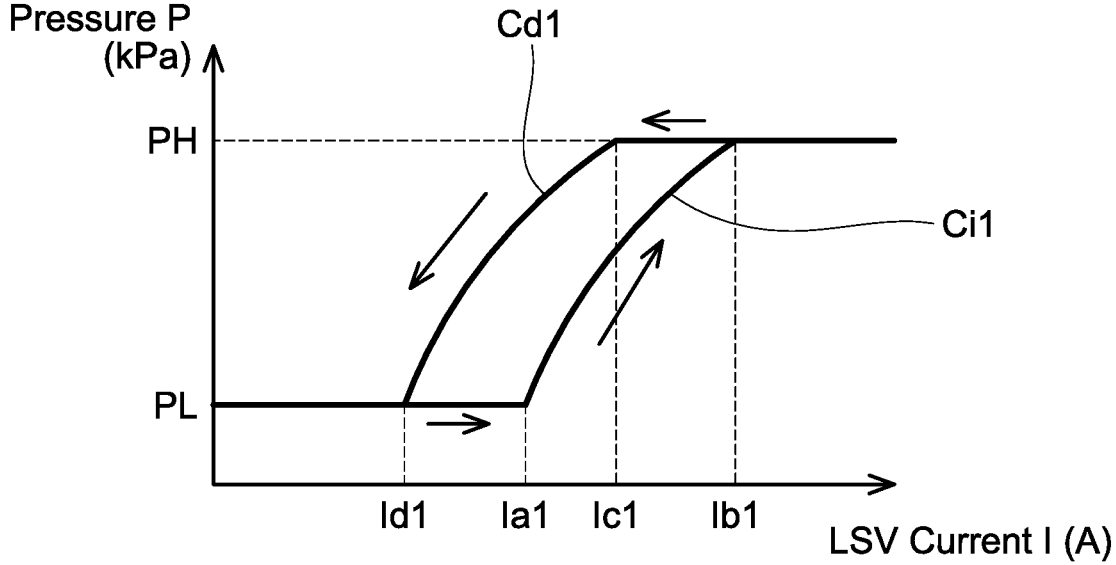
FIG. 2 illustrates a graph indicating a hysteresis characteristic of an LSV.

FIG. 2 illustrates characteristics of the LSV 46. An axis of abscissas in FIG. 2 indicates the LSV current I, and an axis of ordinates in FIG. 2 indicates a pressure P within the supply path 42c. Here, the pressure P is equal to the pressure detected by the pressure sensor 54 in the state where the exhaust valve 56 is closed. As shown in FIG. 2, the LSV 46 has hysteresis characteristics. That is, the LSV 46 has an increase characteristic Ci1 when the LSV current I increases and a decrease characteristic Cd1 when the LSV current I decreases that are different from each other.

Firstly, a case where the LSV current I is increased (that is, increase characteristic Ci1) will be described. While the LSV current I is zero, the LSV 46 is in full-closed state where the hydrogen gas does not flow in the hydrogen gas supply path 42. In this state, the pressure P takes a minimum PL. When the LSV current I is lower than a current Ia1 in the case where the LSV current I is increased, the LSV 46 is maintained in the full-closed state and the pressure P is maintained at the minimum PL. Once the LSV current I has increased to the current Ia1, the LSV 46 starts to open, by which the pressure P starts to rise. Hereafter, the LSV current I upon when the pressure P starts to rise may be termed "rising current". Once the LSV current I has exceeded the rising current Ia1, the opening degree of the LSV 46 increases along with the increasing LSV current I, by which the pressure P increases. Once the LSV current I has increased to a current Ib1, the LSV 46 is in full-open state, by which the pressure P takes a maximum PH. Even when the LSV current I has exceeded the current Ib1, the pressure P does not rise above from the maximum PH.

Next, a case where the LSV current I is decreased (that is, decrease characteristic Cd1) will be described. While the LSV current I is higher than the current Ib1, the LSV 46 is in full-open state and the pressure P takes the maximum PH. In the case where the LSV current I is decreased, the LSV 46 is maintained in the full-open state even when the LSV current I has decreased to the current Ib1. In the case where the LSV current I is decreased, the LSV 46 starts to close and the pressure P starts to drop once the LSV current I has decreased to a current Ic1 which is lower than the current Ib1. Hereafter, the LSV current I upon when the pressure P starts to drop may be termed "falling current". Once the LSV current I has fallen below the falling current Ic1, the opening degree of the LSV 46 decreases along with the decreasing LSV current I, by which the pressure P decreases. In the case where the LSV current I is decreased, once the LSV current I has decreased to a current Id1 which is lower than the rising current Ia1, the LSV 46 is in the full-closed state, by which the pressure P takes the minimum PL.

As mentioned above, the LSV 46 has different characteristics between when the LSV current I increases and when the LSV current I decreases.

Figure 3:
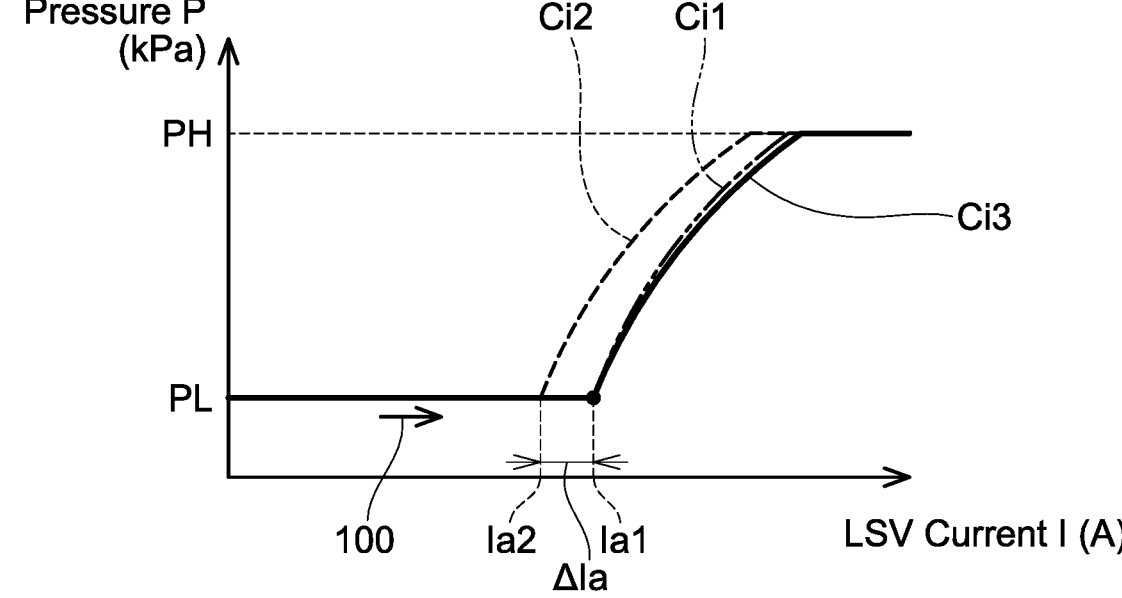
FIG. 3 illustrates a graph indicating correction of increase characteristics of the LSV.
Figure 4:
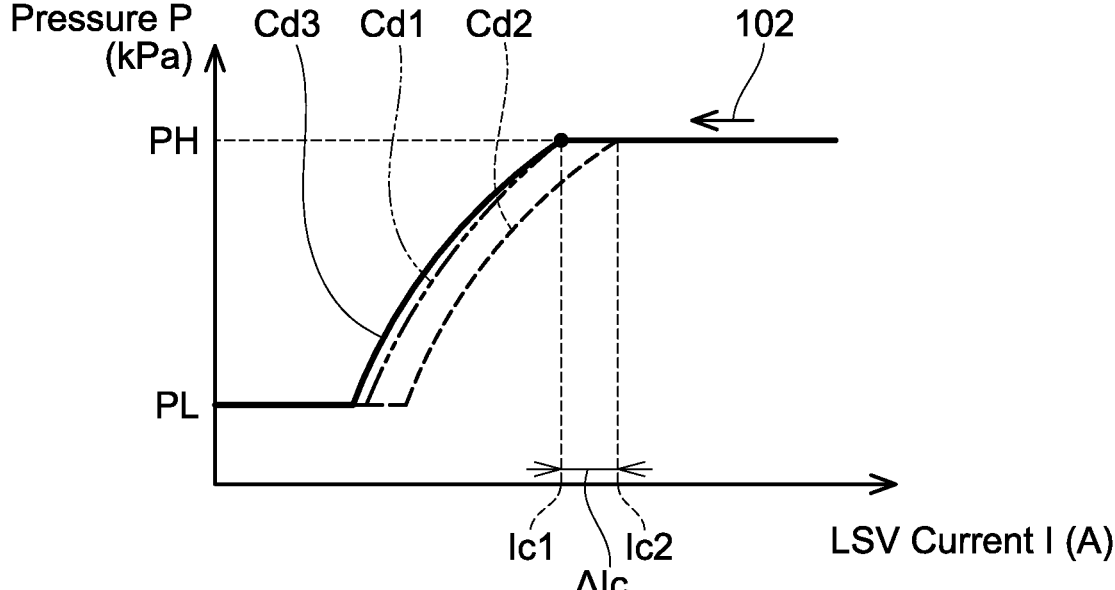
FIG. 4 illustrates a graph indicating correction of decrease characteristics of the LSV.

The control circuit 48 stores a standard increase characteristic Ci2 shown in FIG. 3 and a standard decrease characteristic Cd2 shown in FIG. 4. The standard increase characteristic Ci2 is an increase characteristic as designed of the LSV 46 and the standard decrease characteristic Cd2 is a decrease characteristic as designed of the LSV 46. The actual increase characteristic Ci1 and the actual decrease characteristic Cd1 of the LSV 46 deviate from the standard increase characteristic Ci2 and the standard decrease characteristic Cd2 due to manufacture variation and/or aging. The control circuit 48 therefore performs a learning process of calculating a corrected increase characteristic Ci3 and a corrected decrease characteristic Cd3 that are closer to the actual increase characteristic Ci1 and the actual decrease characteristic Cd1, in which the learning process comprises correcting the standard increase characteristic Ci2 and the standard decrease characteristic Cd2. Hereafter, an embodiment of the learning process performed by the control circuit 48 will be described. The exhaust valve 56 is closed during the learning process of each embodiment to be described below. The pressure P within the supply path 42c is detected by the pressure sensor 54 during the learning process of each embodiment.

First Embodiment

Figure 5:
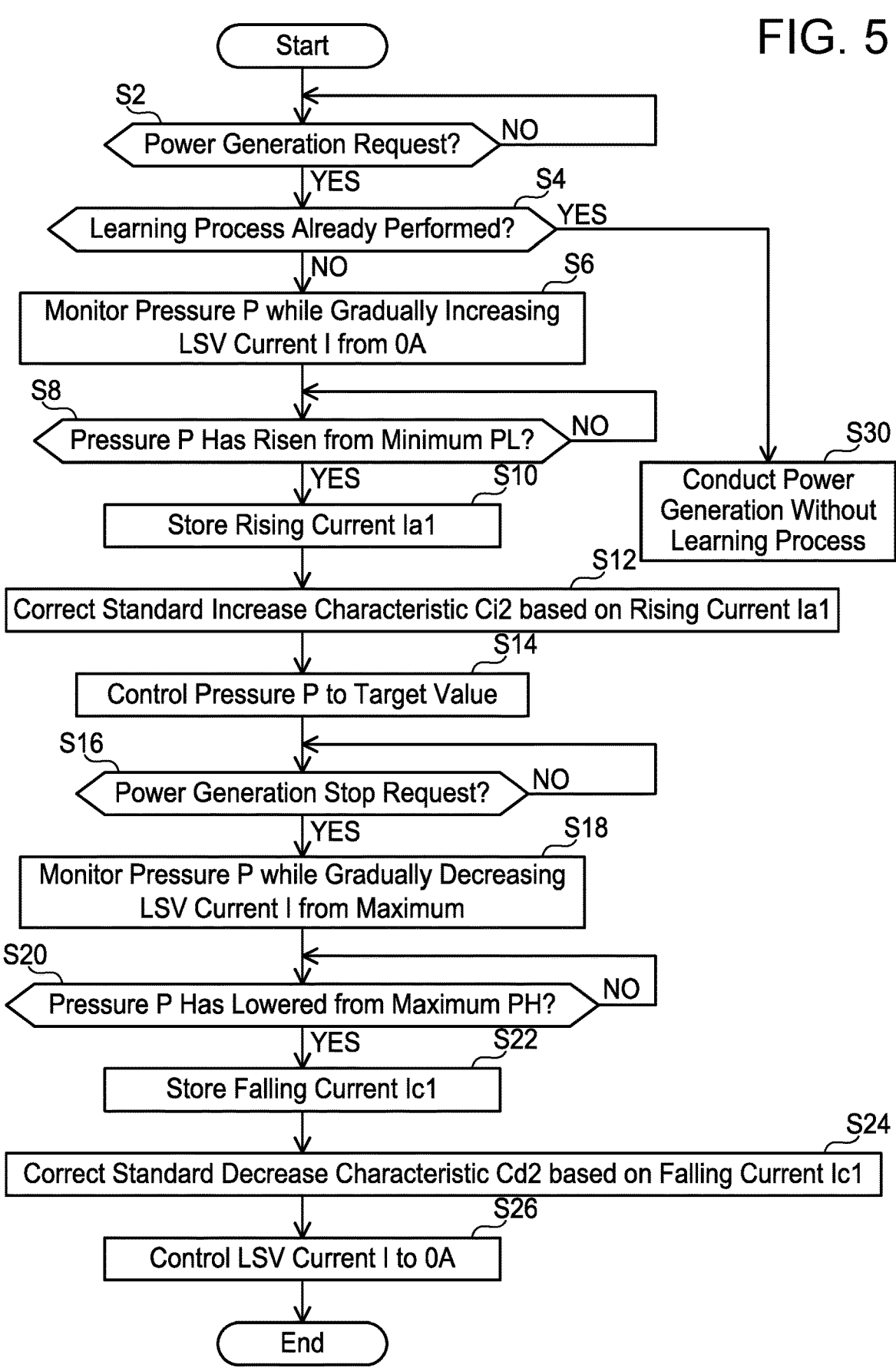
FIG. 5 illustrates a flowchart indicating a learning process according to a first embodiment.

FIG. 5 illustrates a learning process of the first embodiment. A power generation request is inputted to the control circuit 48 from external according to necessities. For example, in the case where the motor 76 or accessory 78 operates, and/or when a remaining level of the battery 70 falls below a standard value, the power generation request is inputted to the control circuit 48. The control circuit 48 performs step S2 periodically and checks whether the power generation request has been inputted or not. When the power generation request is received, the control circuit 48 determines YES in step S2 and performs step S4.

In step S4, the control circuit 48 determines whether the learning process has been conducted or not. In a case where the learning process has not been conducted, the control circuit 48 determines NO in step S4, and performs step S6.

In step S6, the control circuit 48 monitors the pressure P detected by the pressure sensor 54 while gradually increasing the LSV current I from OA. In step S8, the control circuit 48 determines whether the pressure P has risen from the minimum PL during step S6. The control circuit 48 repeats step S8 until the pressure P rises above the minimum PL. The control circuit 48 determines YES in step S8 when the pressure P has risen above the minimum PL. Then, in step S10, the control circuit 48 stores the LSV current I upon when the pressure P has risen above the minimum PL as the rising current Ia1.

For example, as shown by arrow 100 in FIG. 3, the control circuit 48 gradually increases the LSV current I from OA in step S6. While the LSV current I is low, the pressure P detected by the pressure sensor 54 does not rise from the minimum PL. Once the LSV current I has risen to the actual rising current Ia1 of the LSV 46, the pressure P starts to rise. As such, the control circuit 48 determines YES in step S8 at the timing when the pressure P starts to rise, and stores the rising current Ia1 in step S10. As shown in FIG. 3, the rising current Ia1 detected in S10 does not match a rising current Ia2 of the standard increase characteristic Ci2.

Next, in step S12, the control circuit 48 corrects the standard increase characteristic Ci2 based on the detected rising current Ia1. Due to this, the control circuit 48 calculates the corrected increase characteristic Ci3. As an example, as shown in FIG. 3, the control circuit 48 calculates the corrected increase characteristic Ci3 by calculating a difference $\Delta Ia(=Ia1-Ia2)$ between the rising current Ia1 and the rising current Ia2, and adding the difference $\Delta Ia$ to a value of the LSV current I at each coordinate point of the standard increase characteristic Ci2. That is, the control circuit 48 calculates the corrected increase characteristic Ci3 by shifting the standard increase characteristic Ci2 by the difference $\Delta Ia$ in the direction of axis of the LSV current I. According to such calculation of the corrected increase characteristic Ci3, the rising current in the corrected increase characteristic Ci3 matches the actual rising current Ia1 of the LSV 46. Further, such calculation of the corrected increase characteristic Ci3 can allow the corrected increase characteristic Ci3 to be adjusted to the actual increase characteristic Ci1 of the LSV 46 with relatively high precision. Alternatively in another example, the corrected increase characteristic Ci3 may be calculated by calculating a ratio $X(=Ia1/Ia2)$ of the rising current Ia1 to the rising current Ia2 and multiplying the value of the LSV current I at each coordinate point of the standard increase characteristic Ci2 by the ratio X. Such multiplying method of calculating the corrected increase characteristic Ci3 can allow the corrected increase characteristic Ci3 to be adjusted to the actual increase characteristic Ci1 of the LSV 46 with relatively high precision.

Next, in step S14, the control circuit 48 controls the LSV current I to control the pressure P to a target value. Here, the control circuit 48 can control the LSV current I based on the corrected increase characteristic Ci3. Due to this, the fuel cell stack 20 is supplied with the hydrogen gas at a suitable pressure, and thus power is generated in the fuel cell stack 20. The power generated in the fuel cell stack 20 is supplied to the battery 70, the motor drive circuit 72, or the accessory drive circuit 74.

When the power generation has started in the fuel cell stack 20, the control circuit 48 repeats the step S16 to check whether a power generation stop request has been inputted from external or not. When the power generation stop request is received, the control circuit 48 determines YES in step S16 and performs step S18.

In step S18, the control circuit 48 monitors the pressure P detected by the pressure sensor 54 while gradually decreasing the LSV current I from the maximum. In step S20, the control circuit 48 determines whether the pressure P dropped from the maximum PH during step S18. The control circuit 48 repeats step S20 until the pressure P drops from the maximum PH. The control circuit 48 determines YES in step S20 when the pressure P has dropped from the maximum PH. Then in step S22, the control circuit 48 stores the LSV current I at the timing when the pressure P has decreased from the maximum PH as the falling current Ic1.

For example, the control circuit 48 gradually decreases the LSV current I from the maximum value in step S18 as shown by arrow 102 in FIG. 4. The pressure P detected by the pressure sensor 54 does not drop from the maximum PH while the LSV current I is high. The pressure P starts to drop when the LSV current I has dropped to the actual falling current Ic1 of the LSV 46. As such, the control circuit 48 determines YES at the timing when the pressure P starts to drop in step S20 and stores the falling current Ic1 in step S22. In many cases, the falling current Ic1 detected in step S22 does not match the falling current Ic2 of the standard decrease characteristic Cd2 as shown in FIG. 4.

Next, in step S24, the control circuit 48 corrects the standard decrease characteristic Cd2 based on the detected falling current Ic1. Due to this, the control circuit 48 calculates the corrected decrease characteristic Cd3. As an example, as shown in FIG. 4, the control circuit 48 calculates the corrected decrease characteristic Cd3 by calculating a difference $\Delta Ic(=Ic1-Ic2)$ between the falling current Ic1 and the falling current Ic2 and adding the difference $\Delta Ic$ to a value of the LSV current I at each coordinate point of the standard decrease characteristic Cd2. That is, the control circuit 48 calculates the corrected decrease characteristic Cd3 by shifting the standard decrease characteristic Cd2 by the difference $\Delta Ic$ in the direction of axis of the LSV current I. According to such calculation of the corrected decrease characteristic Cd3, the falling current in the corrected decrease characteristic Cd3 matches the actual falling current Ic1 of the LSV 46. Further, such calculation of the corrected decrease characteristic Cd3 allows the corrected decrease characteristic Cd3 to be adjusted to the actual decrease characteristic Cd1 of the LSV 46 with relatively high precision. Alternatively in another example, the corrected decrease characteristic Cd3 may be calculated by calculating a ratio $X(=Ic1/Ic2)$ of the falling current Ic1 to the falling current Ic2 and multiplying the value of the LSV current I at each coordinate point of the standard decrease characteristic Cd2 by the ratio X. Such multiplying method of calculating the corrected decrease characteristic Cd3 also allows the corrected decrease characteristic Cd3 to be adjusted to the actual decrease characteristic Cd1 of the LSV 46 with relatively high precision.

Next, in step S26, the control circuit 48 lowers the LSV current I to 0A, and fully closes the LSV 46. Due to this, the provision of the hydrogen gas to the fuel cell stack 20 stops, and thereby power generation by the fuel cell stack 20 stops.

As described above, the corrected increase characteristic Ci3 and the corrected decrease characteristic Cd3 are calculated by the learning process of steps S6 to S24.

In a case where the power generation request is issued after the learning process, the control circuit 48 determines YES in step S4 and conducts power generation without the learning process in step S30. Here, the control circuit 48 controls the LSV current I based on the corrected increase characteristic Ci3 and the corrected decrease characteristic Cd3. Due to this, the pressure P can be accurately controlled.

As mentioned above, in the first embodiment, the control circuit 48 has the standard increase characteristic Ci2 stored therein, and corrects the standard increase characteristic Ci2 based on the actually-measured rising current Ia1 to calculate the corrected increase characteristic Ci3. Such method allows for calculation of the corrected increase characteristic Ci3 that is close to the actual increase characteristic Ci1 of the LSV 46. Further, such method does not require actual measurements at plural points of correlation between the LSV current I and the pressure P, and thus the corrected increase characteristic Ci3 can be easily calculated.

Also, in the first embodiment, the control circuit 48 has the standard decrease characteristic Cd2 stored therein, and corrects the standard decrease characteristic Cd2 based on the actually-measured falling current Ic1 to calculate the corrected decrease characteristic Cd3. Such method allows for calculation of the corrected decrease characteristic Cd3 that is close to the actual decrease characteristic Cd1 of the LSV 46. Further, such method does not require actual measurements at plural points of the correlation between the LSV current I and the pressure P, and thus the corrected decrease characteristic Cd3 can be easily calculated.

In the first embodiment, each of the increase characteristic and the decrease characteristic are corrected independently. The LSV 46 has the hysteresis characteristics, where the increase characteristic and the decrease characteristic are different from each other, as mentioned above. As such, by correcting each of the increase characteristic and the decrease characteristic independently as in the first embodiment, these characteristics can suitably be corrected.

Second Embodiment

Figure 6:
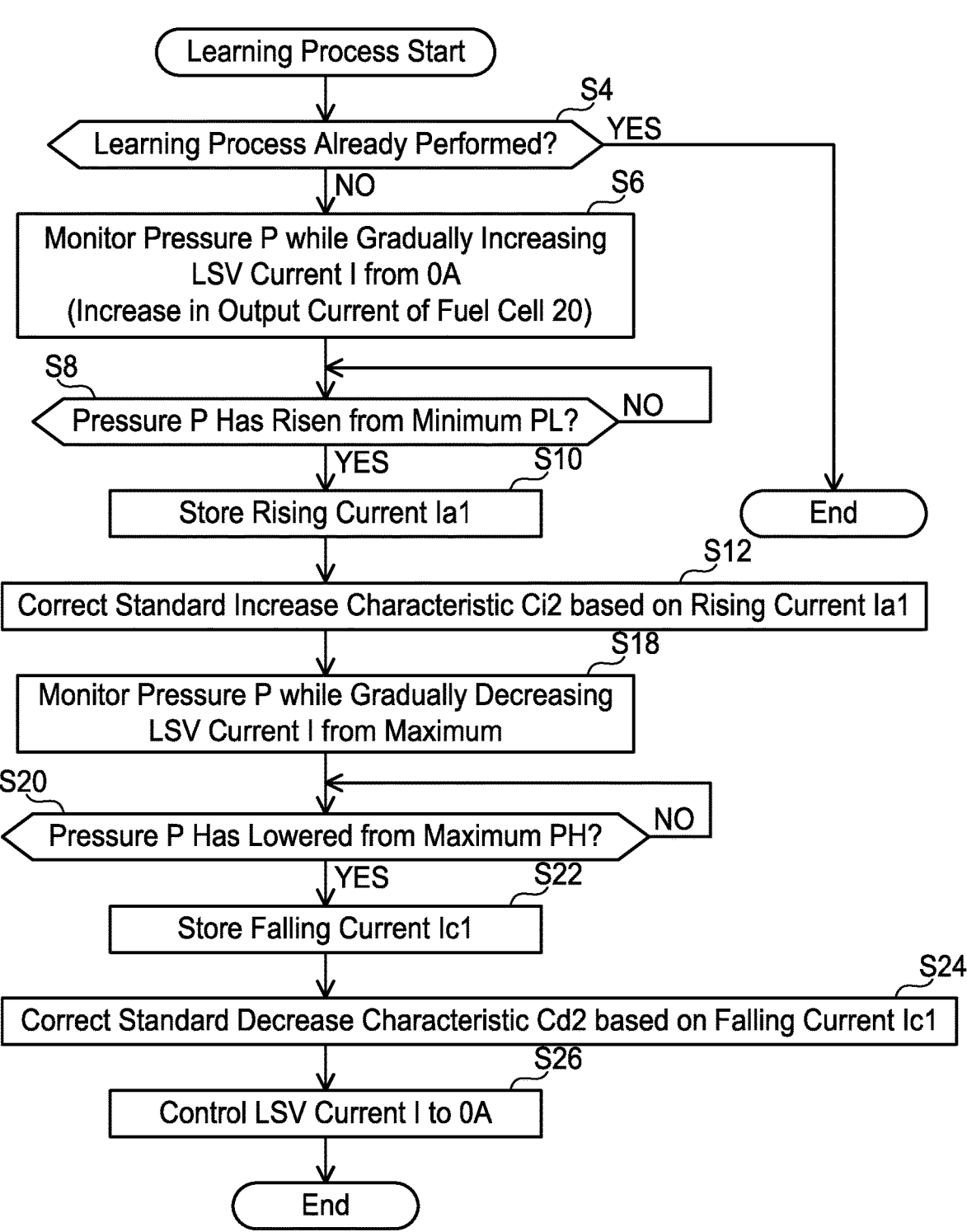
FIG. 6 illustrates a flowchart indicating a learning process according to a second embodiment.

FIG. 6 illustrates a learning process according to a second embodiment. The learning process of the second embodiment is performed irrespective of whether there is a power generation request or not. In step S4, the control circuit 48 determines whether the learning process has been performed or not. In a case where the learning process has been performed, the control circuit 48 determines YES in step S4 and completes process of FIG. 6. In a case where the learning process has not been performed, the control circuit 48 determines NO in step S4 and performs steps S6 to S12. Steps S6 to S12 of the second embodiment are the same as steps S6 to S12 of the first embodiment. In steps S6 to S12 of the second embodiment, therefore, the corrected increase characteristic Ci3 is calculated. That is, similarly to the first embodiment, the control circuit 48 calculates the corrected increase characteristic Ci3, by actually measuring the rising current Ia1 and correcting the standard increase characteristic Ci2 based on the rising current Ia1. Here, when the LSV current I is increased in steps S6 to S12, an output electric current of the fuel cell stack 20 increases despite of the absence of the power generation request. Here, the output electric current of the fuel cell stack 20 is supplied to the battery 70, by which the battery 70 is charged.

Next, the control circuit 48 performs steps S18 to S26. Steps S18 to S26 of the second embodiment are the same as steps S18 to S26 of the first embodiment. In steps S18 to S26 of the second embodiment, therefore, the corrected decrease characteristic Cd3 is calculated. That is, similarly to the first embodiment, the control circuit 48 calculates the corrected decrease characteristic Cd3, by actually measuring the falling current Ic1 and correcting the standard decrease characteristic Cd2 based on the falling current Ic1.

As mentioned above, according to the configuration of the second embodiment, the learning process can be performed even in the case where there is no power generation request. The control circuit 48 controls the LSV 46 based on the corrected increase characteristic Ci3 and the corrected decrease characteristic Cd3 after the learning process.

Third Embodiment

Figure 7:
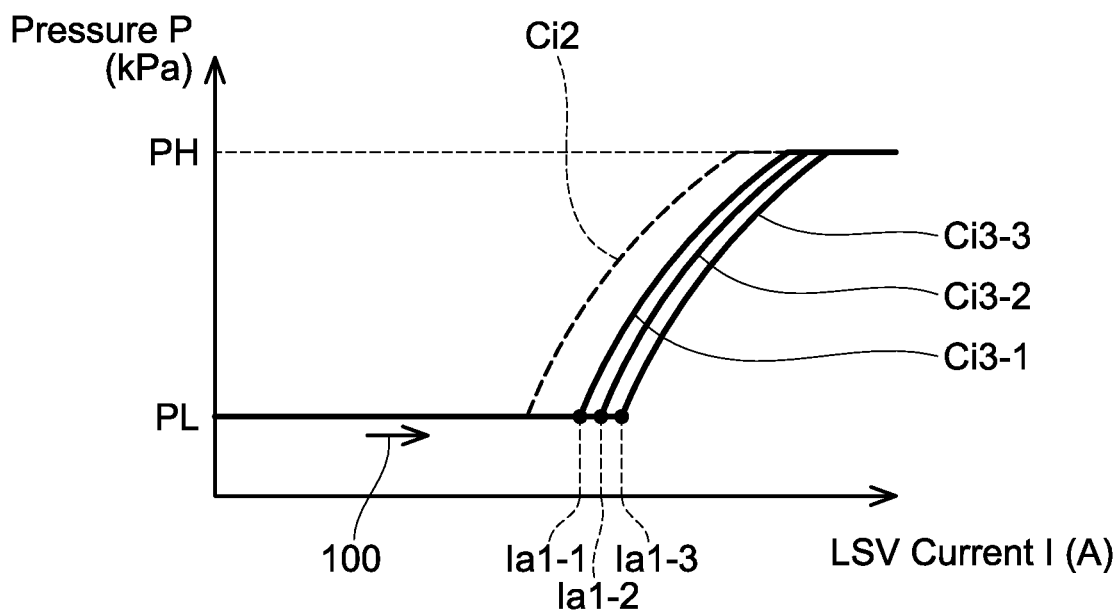
FIG. 7 illustrates a graph indicating correction of the increase characteristics of the LSV for respective sweep speeds.
Figure 8:
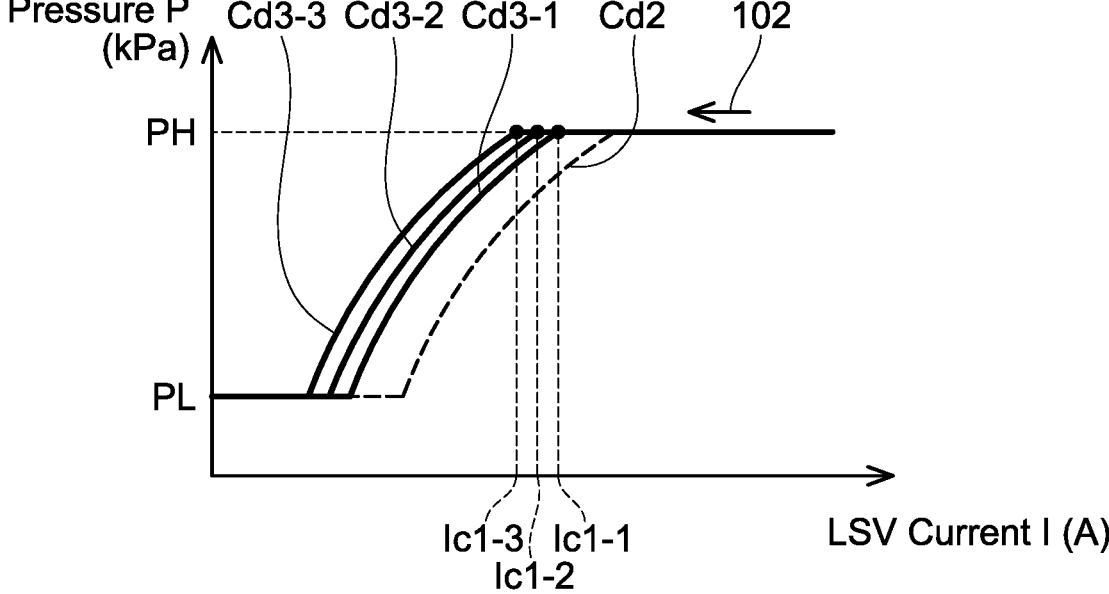
FIG. 8 illustrates a graph indicating correction of the decrease characteristics of the LSV for respective sweep speeds.

The rising current Ia1 may become higher as a sweep speed of the LSV current I (that is, speed at which the LSV current I is changed) is faster. For example, as shown in FIG. 7, in a case where the sweep speed is slow, the rising current may be a low rising current Ia1-1; in a case where the sweep speed is moderate, the rising current may be an intermediate rising current Ia1-2; and in a case where the sweep speed is fast, the rising current may be a high rising current Ia1-3. On the other hand, the falling current Ic1 may become lower as the sweep speed of the LSV current I is faster. For example, as shown in FIG. 8, in a case where the sweep speed is slow, the falling current may be a high falling current Ic1-1; in a case where the sweep speed is moderate, the falling current may be an intermediate falling current Ic1-2; and in a case where the sweep speed is fast, the falling current may be a low falling current Ic1-3. In the third embodiment, the increase characteristic and the decrease characteristic are corrected for each sweep speed of the LSV current I when the LSV 46 as such is used.

In the third embodiment, the learning process is repeated plural times by the control circuit 48. Each learning process may be performed in response to the power generation request as in the first embodiment, or each learning process may be performed irrespective of presence/absence of the power generation request as in the second embodiment.

In a first learning process, the control circuit 48 detects the rising current Ia1-1 while increasing the LSV current I at a slow sweep speed (e.g., 0.01 A/sec). When the rising current Ia1-1 is detected, the control circuit 48 corrects the standard increase characteristic Ci2 based on the rising current Ia1-1 to thereby calculate a corrected increase characteristic Ci3-1. The control circuit 48 stores the calculated corrected increase characteristic Ci3-1 as a corrected increase characteristic for the slow sweep speed. Also in the first learning process, the control circuit 48 detects the falling current Ic1-1 while lowering the LSV current I at the slow sweep speed. When the falling current Ic1-1 is detected, the control circuit 48 corrects the standard decrease characteristic Cd2 based on the falling current Ic1-1 to thereby calculate a corrected decrease characteristic Cd3-1. The control circuit 48 stores the calculated corrected decrease characteristic Cd3-1 as a corrected decrease characteristic for the slow sweep speed.

In a second learning process, the control circuit 48 detects the rising current Ia1-2 while increasing the LSV current I at a moderate sweep speed (e.g., 0.05 A/sec). When the rising current Ia1-2 is detected, the control circuit 48 corrects the standard increase characteristic Ci2 based on the rising current Ia1-2 to thereby calculate a corrected increase characteristic Ci3-2. The control circuit 48 stores the calculated corrected increase characteristic Ci3-2 as a corrected increase characteristic for the moderate sweep speed. Also in the second learning process, the control circuit 48 detects the falling current Ic1-2 while lowering the LSV current I at the moderate sweep speed. When the falling current Ic1-2 is detected, the control circuit 48 corrects the standard decrease characteristic Cd2 based on the falling current Ic1-2 to thereby calculate a corrected decrease characteristic Cd3-2. The control circuit 48 stores the calculated corrected decrease characteristic Cd3-2 as a corrected decrease characteristic for the moderate sweep speed.

In a third learning process, the control circuit 48 detects the rising current Ia1-3 while increasing the LSV current I at a fast sweep speed (e.g., 0.1 A/sec). When the rising current Ia1-3 is detected, the control circuit 48 corrects the standard increase characteristic Ci2 based on the rising current Ia1-3 to thereby calculate a corrected increase characteristic Ci3-3. The control circuit 48 stores the calculated corrected increase characteristic Ci3-3 as a corrected increase characteristic for the fast sweep speed. Also in the third learning process, the control circuit 48 detects the falling current Ic1-3 while lowering the LSV current I at the fast sweep speed. When the falling current Ic1-3 is detected, the control circuit 48 corrects the standard decrease characteristic Cd2 based on the falling current Ic1-3 to thereby calculate a corrected decrease characteristic Cd3-3. The control circuit 48 stores the calculated corrected decrease characteristic Cd3-3 as a corrected decrease characteristic for the fast sweep speed.

As described above, the control circuit 48 calculates the corrected increase characteristic and the corrected decrease characteristic for each sweep speed in the third embodiment. After the learning processes have completed, the control circuit 48 selects the corrected increase characteristic and the corrected decrease characteristic according to the sweep speed of the LSV current I, and controls the LSV current I in accordance with the selected corrected increase characteristic and the selected corrected decrease characteristic. Thus, the pressure P can be accurately controlled.

In each of the first to third embodiments, both of the increase characteristic and the decrease characteristic are corrected. Alternatively, only one of the increase characteristic and the decrease characteristic may be corrected.

In each of the first to third embodiments, the learning process is performed when the learning process has not been performed yet. Alternatively, the learning process may be performed periodically even when the learning process has already been performed. Such periodical learning process allows to calculate the corrected increase characteristic and the corrected decrease characteristic to follow aging of the characteristics of the LSV 46.

In each of the first to third embodiments, the control of the LSV 46 is described. Alternatively, another type of solenoid valve (e.g., rotary solenoid valve) may be used instead of the LSV 46.

In the above embodiments, the fuel cell system mounted in an electric vehicle is described. Alternatively, the art disclosed herein may be applied to another type of fuel cell system such as a stationary type.

In the above embodiments, the corrected increase characteristic is calculated by correcting the standard increase characteristic based on the rising current. Alternatively, the increase characteristic of the LSV may be calculated with another calculation method using the rising current. For example, the increase characteristic may be calculated, by drawing a graph such that the pressure P rises from the coordinate point of the rising current in accordance with a predetermined function. Also in the above embodiments, the corrected decrease characteristic is calculated by correcting the standard decrease characteristic based on the falling current. Alternatively, the decrease characteristic of the LSV may be calculated with another calculation method using the falling current. For example, the decrease characteristic may be calculated, by drawing a graph such that the pressure P decreases from the coordinate point of the falling current in accordance with a predetermined function.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A fuel cell system, comprising:
a fuel cell;
a hydrogen gas supply passage configured to supply hydrogen gas to the fuel cell;
a solenoid valve configured to change an opening degree of the hydrogen gas supply passage;
a pressure sensor configured to detect a pressure in a downstream supply passage which is a part of the hydrogen gas supply passage from the solenoid valve to the fuel cell; and
a control circuit configured to control the solenoid valve, wherein the control circuit is configured to perform:
detection of a rise in the pressure detected by the pressure sensor when increasing a conducted electric current conducted in the solenoid valve from a state where the solenoid valve is closed, and detection of a rising current which is the conducted electric current at a time of the rise in the pressure;
calculation of an increase characteristic based on the rising current, the increase characteristic being a relationship between the conducted electric current and the pressure when the conducted electric current increases; and
controlling the solenoid valve based on the calculated increase characteristic.

2. The fuel cell system of claim 1, wherein the control circuit is configured to store a standard increase characteristic of the solenoid valve and calculate the increase characteristic by correcting the standard increase characteristic based on the rising current.

3. The fuel cell system of claim 1, wherein
the control circuit is configured to perform:
detection of a fall in the pressure detected by the pressure sensor when decreasing the conducted electric current in the solenoid valve from a state where the solenoid valve is open and detection of a falling current which is the conducted electric current at a time of the fall in the pressure; and
calculation of a decrease characteristic based on the falling current, the decrease characteristic being a relationship between the conducted electric current and the pressure when the conducted electric current decreases.

4. The fuel cell system of claim 3, wherein the control circuit is configured to store a standard decrease characteristic of the solenoid valve and calculate the decrease characteristic by correcting the standard decrease characteristic based on the falling current.

5. The fuel cell system of claim 1, further comprising an exhaust valve configured to exhaust the hydrogen gas in the downstream supply passage to outside,
wherein the control circuit is configured to perform the detection of the rising current under a state where the exhaust valve is closed.

6. The fuel cell system of claim 1, further comprising a battery,
wherein the battery is charged by a power generated by the fuel cell in the detection of the rising current.

7. The fuel cell system of claim 1, wherein
the detection of the rising current comprises detection of a first rising current which is the rising current when increasing the conducted electric current at a first sweep speed, and detection of a second rising current which is the rising current when increasing the conducted electric current at a second sweep speed, and
the calculation of the increase characteristic comprises calculation of a first increase characteristic which is the increase characteristic when increasing the conducted electric current at the first sweep speed based on the first rising current, and calculation of a second increase characteristic which is the increase characteristic when increasing the conducted electric current at the second sweep speed based on the second rising current.

8. A fuel cell system, comprising:
a fuel cell;
a hydrogen gas supply passage configured to supply hydrogen gas to the fuel cell;
a solenoid valve configured to change an opening degree of the hydrogen gas supply passage;

a pressure sensor configured to detect a pressure in a downstream supply passage which is a part of the hydrogen gas supply passage from the solenoid valve to the fuel cell; and a control circuit configured to control the solenoid valve, wherein the control circuit is configured to perform:

detection of a fall in the pressure detected by the pressure sensor when decreasing a conducted electric current conducted in the solenoid valve from a state where the solenoid valve is open and detection of a falling current which is the conducted electric current at a time of the fall in the pressure;

calculation of a decrease characteristic based on the falling current, the decrease characteristic being a relationship between the conducted electric current and the pressure when the conducted electric current decreases; and control of the solenoid valve based on the calculated decrease characteristic.

* * * * *